United States Patent [19]
Schulte

[11] Patent Number: 5,367,919
[45] Date of Patent: Nov. 29, 1994

[54] CARRIER FOR USE IN TORQUE TRANSMITTING APPARATUS

[75] Inventor: Louis F. Schulte, Bühl, Germany

[73] Assignee: Luk Lamellen und Kupplungsbau GmbH, Buhl, Germany

[21] Appl. No.: 22,735

[22] Filed: Feb. 24, 1993

[30] Foreign Application Priority Data

Mar. 3, 1992 [DE] Germany .................. 4206635

[51] Int. Cl.⁵ .................. G05G 1/00; F16D 13/18
[52] U.S. Cl. .................. 74/572; 192/70.17; 464/68
[58] Field of Search .............. 74/572, 573 R, 574; 192/70.17, 87.15; 464/66, 68

[56] References Cited

U.S. PATENT DOCUMENTS

| | | | |
|---|---|---|---|
| 3,808,660 | 5/1974 | Wik | 74/573 R X |
| 3,838,464 | 9/1974 | Doyle | 74/573 R X |
| 3,845,622 | 11/1974 | Hufstader | 74/573 R |
| 3,964,342 | 6/1976 | Beam et al. | 74/573 R |
| 4,236,425 | 12/1980 | Bellati et al. | 74/573 R |
| 4,241,620 | 12/1980 | Pichl et al. | 74/572 |
| 4,512,681 | 4/1985 | Hayhurst et al. | 74/573 R X |
| 4,520,688 | 6/1985 | Ban | 74/572 |
| 4,591,041 | 5/1986 | Valier | 74/573 R X |
| 4,714,147 | 12/1987 | Szodfridt et al. | 192/87.15 |
| 4,778,040 | 10/1988 | Kabayama | 74/573 R X |
| 5,048,658 | 9/1991 | Reik | 192/106.2 |
| 5,160,007 | 11/1992 | Riek | 192/70.17 |

FOREIGN PATENT DOCUMENTS

| | | | |
|---|---|---|---|
| 58-83566 | 5/1983 | Japan | 74/573 R |
| 3-89047 | 4/1991 | Japan | 74/573 R |
| 4-34251 | 2/1992 | Japan | 74/573 R |
| 378068 | 7/1964 | Switzerland | 74/574 |
| 775646 | 10/1980 | U.S.S.R. | 74/573 R |
| 984796 | 1/1983 | U.S.S.R. | 74/573 R |

*Primary Examiner*—Vinh T. Luong
*Attorney, Agent, or Firm*—Darby & Darby

[57] ABSTRACT

The hub of a composite flywheel is made of cast steel and comprises an axial extension with an external surface which is a press fit in a disc-shaped element of the primary flywheel of the composite flywheel. A centrally located through hole of the hub is surrounded by a second surface constituting a seat for and being a press fit on the outer race of a pilot bearing for the input element of a variable-speed transmission receiving torque from the composite flywheel through a friction clutch. The extension is made yieldable so that its fitting into the disc-shaped element does not result in deformation of the second surface and does not cause problems in connection with installation of the pilot bearing in the hub. Moreover, the clearance between the pilot bearing and the hub cannot be reduced below a value which could entail premature wear upon the bearing and would shorten the useful life of the composite flywheel.

15 Claims, 3 Drawing Sheets

CARRIER FOR USE IN TORQUE TRANSMITTING APPARATUS

BACKGROUND OF THE INVENTION

The invention relates to improvements in dynamically balanced (rotationally symmetrical) rotary carriers which can be made of a metallic material and can be used as hubs or naves in vibration-damping torque-transmitting apparatus, e.g., in the power trains of motor vehicles to transmit torque from an output element (e.g., crankshaft) of a combustion engine to a rotary input element of a variable-speed transmission which transmits torque to the wheels of a motor vehicle.

It is already known to provide a carrier of the above outlined character with an axial extension having an external surface which supports a first element extending substantially radially outwardly of the axis of rotation of the carrier. It is also known to provide the just outlined conventional carrier with a second surface which is disposed radially inwardly of the external surface and is a press fit on a further element, e.g., a pilot bearing for the input element of the aforementioned transmission. One of the two elements is more sensitive to deformation than the other element.

A drawback of presently known carriers (e.g., hubs) of the above outlined character is that a part which is mounted on or in the carrier in rather close proximity to one or more fits (e.g., by pressing, welding, screwing and/or by resorting to further machining, such as embossing or chiseling) is likely to adversely influence the fits or accurately finished surfaces, particularly by bringing about at least partial deformation exceeding a value which is required to establish and maintain the desirable or necessary tolerances. This can create problems in connection with the mounting of one or more additional parts immediately adjacent or close to the deformed surface or surfaces of the carrier. In fact, the deformation can be so pronounced that one or more additional parts cannot be mounted on or in the carrier. Such problems can arise in connection with the assembly and installation of friction clutches and/or apparatus which are used to absorb or damp vibrations and/or to transmit torque between the output element of a combustion engine and the input element of a variable-speed transmission in a motor vehicle.

OBJECTS OF THE INVENTION

An object of the invention is to provide a novel and improved carrier which is constructed and assembled in such a way that its parts are not likely to undergo excessive deformation and which can be used as a support for a plurality of elements in the form of bearings, discs and/or others.

Another object of the invention is to provide a carrier wherein the establishment of a press fit between one of its surfaces and a disc, a bearing or another element is less likely to cause excessive deformation of the other surface or surfaces than in heretofore known carriers.

A further object of the invention is to provide a carrier wherein the establishment of one or more press fits between cylindrical, conical or otherwise configurated surfaces of the carrier and discs, bearings or other elements does not entail undue deformation of the surfaces so that the diameters and/or shapes of such surfaces remain within acceptable ranges.

An additional object of the invention is to provide a relatively simple and inexpensive carrier which can be automatically assembled with other parts of a vibration damping, torque transmitting or other apparatus.

Still another object of the invention is to provide a device, such as a composite flywheel, which embodies a carrier of the above outlined character.

SUMMARY OF THE INVENTION

One feature of the present invention resides in the provision of a dynamically balanced (rotationally symmetrical) rotary carrier which contains a metallic material (such as gray cast steel) and has an axis of rotation as well as a ring-shaped axial extension with an external surface (e.g., a cylindrical external surface) which is a press fit in a substantially radially outwardly extending first element. The carrier further includes a second surface (e.g., a cylindrical surface) which is disposed radially inwardly of the external surface of the extension and is a press fit on a further element. One of these elements is more sensitive to deformation than the other element, and the carrier further includes a recess (e.g., a circumferentially complete annular groove) in a portion at least of a region of propagation of lines of force (such lines of force develop as a result of the establishment of a press fit between the other element and the respective surface) toward the one element.

One of the two surfaces at least partially overlaps the other surface in the direction of the aforementioned axis, i.e., at least a portion of one of these surfaces overlaps at least a portion of the other surface.

The first element can include a substantially disc-shaped component, e.g., a flywheel. For example, the first element can form part of a primary flywheel which, in turn, forms part of a divided flywheel (e.g., a divided flywheel of the type adapted to be used in a vibration-damping torque-transmitting apparatus between the output element of a combustion engine and the input element of a variable-speed transmission in a motor vehicle). Alternatively, the first element can form part of or can constitute the input element of a twin-mass flywheel.

The second element can constitute or include a pilot bearing for the input element of the transmission.

The extension is preferably provided with an internal surface (e.g., a cylindrical or frustoconical internal surface) which is disposed radially inwardly of the external surface and can constitute a centering seat for a centering collar on the crankshaft of an internal combustion engine. The internal surface has a finish which can be applied prior or subsequent to press fitting of the first element onto the external surface.

The press fit between the first element and the external surface of the carrier can be established subsequent to a highly precise finishing of the internal surface of the first element and/or the external surface of the extension, e.g., with a stamping tool.

The recess can extend in the direction of the aforementioned axis beyond the overlapping portions of the external surface and the second surface.

Another feature of the invention resides in the provision of a composite flywheel including a primary flywheel which comprises a disc, and a carrier having a ring-shaped axial extension including an external surface which is a press fit in the disc. The carrier further includes a second surface which is disposed radially inwardly of the external surface and is a press fit (with a certain clearance) on a pilot bearing for a rotary transmission shaft. Still further, the carrier includes a portion which extends axially and radially between the external and second surfaces, and the composite flywheel further comprises a secondary flywheel which is coaxial with the primary flywheel, and an antifriction bearing which is installed with clearance between the primary and secondary flywheels. At least the external and second surfaces and the aforementioned portion of the carrier are constructed, assembled and configured to prevent a reduction of at least one of the aforementioned clearances below a predetermined value (namely below a value which would entail a shortening of useful life of the composite flywheel) as a result of deformation of the carrier at the external surface due to the establishment of press fit between the external surface of the carrier and the disc.

As already mentioned above, the carrier can contain or can consist of gray cast steel. As also mentioned hereinbefore, the press fit between the disc and the external surface of the carrier can be established subsequent to a highly accurate treatment of the internal surface of the disc and/or the external surface of the carrier. Furthermore, and if at least a portion of one of the external and second surfaces overlaps at least a portion of the other of these surfaces in the axial direction of the carrier, the recess preferably extends axially of the flywheels beyond the overlapping portions of the external and second surfaces.

The novel features which are considered as characteristic of the invention are set forth in particular in the appended claims. The improved carrier itself, however, both as to its construction and the mode of using the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
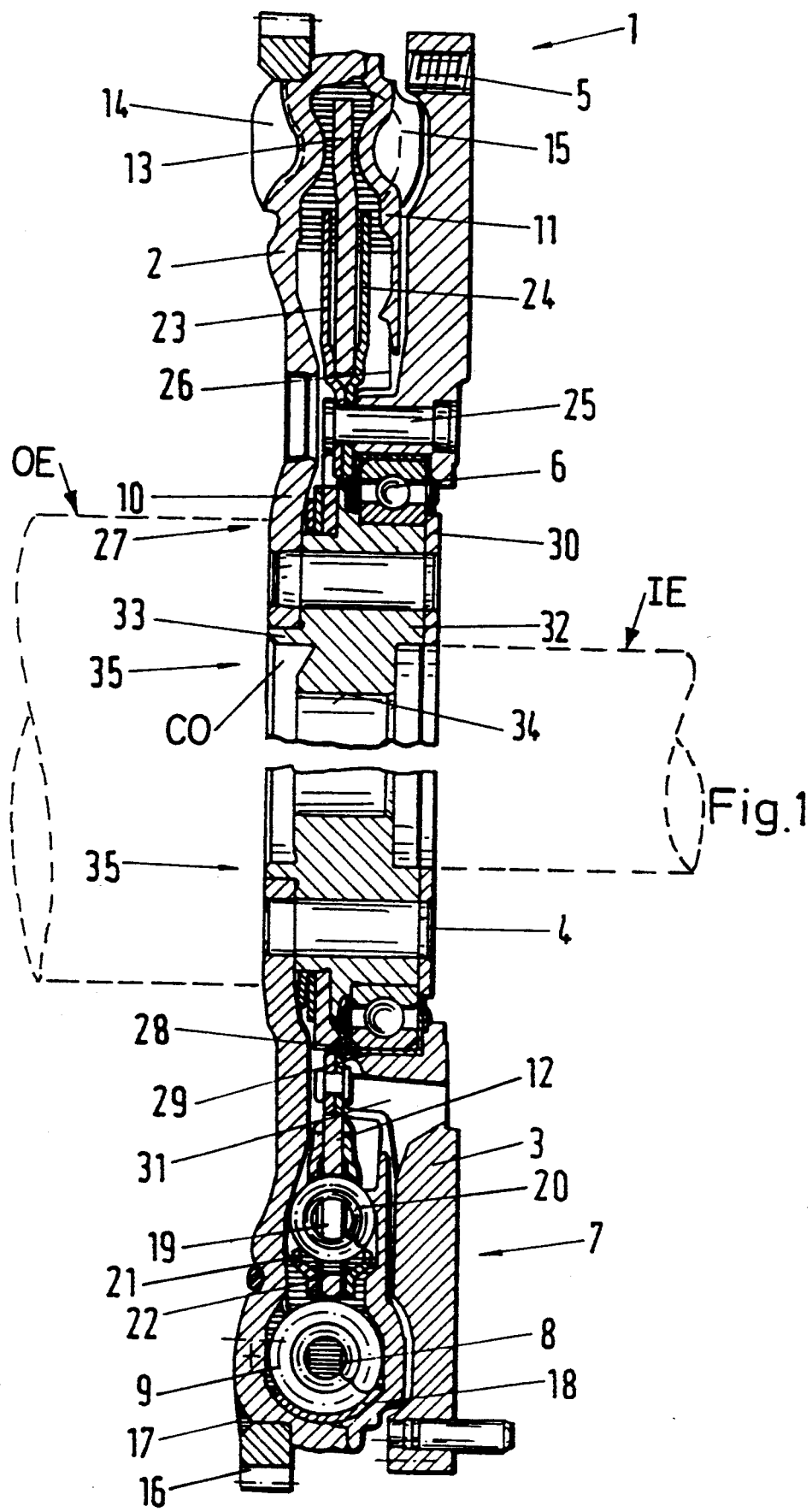
FIG. 1 is a fragmentary axial sectional view of a composite flywheel including a rotary carrier which embodies one form of the invention.

Referring first to FIG. 1, there is shown a composite flywheel 1 which comprises a rotary primary flywheel 2 and a secondary flywheel 3 coaxial with the primary flywheel. The primary flywheel 2 is affixed to the output element OE (e.g., a crankshaft) of a combustion engine in a motor vehicle. The means for connecting the primary flywheel 2 to the output element OE of the engine can comprise a set of screws, bolts or other suitable fasteners having shanks extending through axially parallel bores or holes 4 provided in a novel and improved hub or carrier 32 of the composite flywheel 1. Reference may be had, for example, to commonly owned U.S. Pat. No. 5,048,658 granted Sep. 17, 1991 to Reik and/or to commonly owned U.S. Pat. No. 5,160,007 granted Nov. 3, 1992 to Reik et al. The disclosures of these commonly owned patents are incorporated herein by reference.

Figure 2:
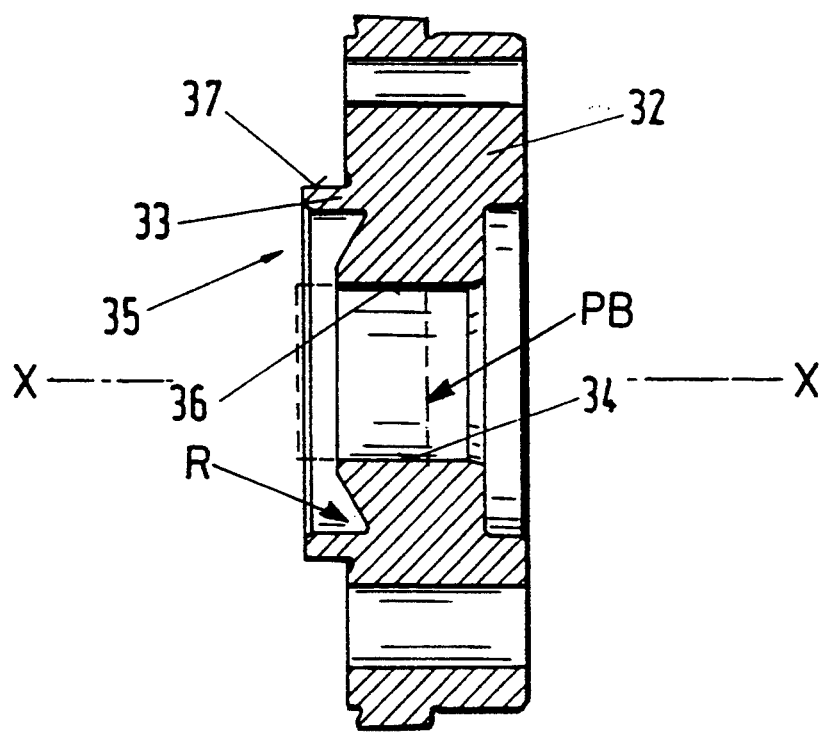
FIG. 2 is an enlarged axial sectional view of the carrier.

The secondary flywheel 3 is provided with tapped bores or holes 5 for reception of screws, bolts or other suitable fasteners which secure the flywheel 3 to the housing or cover of a friction clutch (not shown) serving to transmit torque to the rotary input element IE of a variable-speed transmission in the power train of a motor vehicle. Reference may be had again to the aforementioned patents to Reik and Reik et al. which show a transmission, the input element of the transmission as well as a suitable friction clutch. The clutch can be engaged to transmit torque from the secondary flywheel 3 to the input element IE of the transmission. The secondary flywheel 3 can receive torque from the output element OE of the combustion engine through the primary flywheel 2 and a damper 7 which is installed between the flywheels 2 and 3. The character 6 denotes an antifriction bearing (e.g., a ball bearing with a single annulus of rolling elements) which surrounds a portion of the carrier 32 and is received in an axial recess of the secondary flywheel 3. The flywheels 2 and 3 have at least some freedom of angular movement relative to each other about an axis X—X which is shown in FIG. 2 and is common to the bearing 6 as well as to the hub or carrier 32.

The primary flywheel 2 constitutes the input element of the damper 7 and includes a housing defining an annular camber 8 extending circumferentially of the carrier 32 and receiving certain parts of the damper 7 including a set of arcuate energy storing elements in the form of coil springs 9. The springs 9 are preferably shaped to assume an arcuate shape with radii of curvature corresponding to the radius of the chamber 8 prior to insertion of such springs into the housing of the primary flywheel 2. In other words, the configuration of the springs 9 prior to introduction into the chamber 8 can be selected in such a way that these springs need not undergo any, or any appreciable, deformation for the purpose of inserting them into the housing of the primary flywheel 2.

The housing of the primary flywheel 2 consists essentially of two substantially disc-shaped elements or sections 10 and 11. The radially outermost portions of these elements are fixedly and sealingly secured to each other around the annular chamber 8. The damper 7 further comprises an output element in the form of a radially extending flange 12 installed between the elements 10, 11 of the primary flywheel 2 and having radially outwardly projecting arms 13 which alternate with the arcuate coil springs 9. The sections 10, 11 can be made of a metallic sheet material, the same as the flange 12. The coil springs 9 of the damper 7 are caused to store energy, or to store additional energy, in response to angular displacement of the flywheel 2 relative to the flywheel 3 and/or vice versa. These springs are then deformed between the arms 13 of the flange 12 on the one hand and the axially extending pockets 14, 15 or otherwise configured portions of the sections 10, 11.

The character 16 denotes in FIG. 1 a starter gear which is welded to the radially outermost portion of the section 10, as at 17. The connection 17 can include a continuous circumferentially complete welded seam or a set of relatively short arcuate seams.

The annular chamber 8 is at least partially filled with a viscous fluid, particularly a lubricant. For example, the chamber 8 can be filled with grease to such an extent that at least the radially outermost portions of the springs 9 are contacted by grease when the engine drives the primary flywheel 2 so that the supply of grease gathers in the radially outermost portion of the annular chamber 8 under the action of centrifugal force.

This chamber further accommodates arcuate shields 18 which are disposed between the radially outermost portions of the springs 9 and the adjacent portions of the internal surfaces of the sections 10, 11 and serve to reduce wear upon these sections. The arrangement is or can be such that the springs 9 contact the shields 18 at least when they are acted upon by centrifugal force, i.e., when the engine drives the primary flywheel 2. The shields 18 extend in the circumferential direction of the chamber 8 as well as circumferentially of the coil springs 9, e.g., along arcs of nearly 180° (see the lower portion of FIG. 1). It will be noted that the internal surfaces of the shields 18 at least substantially conform to the outlines of the adjacent portions of the external surfaces of the springs 9.

The radially inner portions of the output element or flange 12 are provided with openings 19 in the form of arcuate cutouts or slots for central portions of additional energy storing elements 20 in the form of coil springs having diameters smaller than those of the coil springs 9. The damper 7 is a composite damper including a first damping unit whose input element is the primary flywheel 2, whose output element is the flange 12 and which further includes the outer energy storing elements 9. A second damping unit of the damper 7 includes an input element constituted by the flange 12, an output element including two discs 23, 24 and the secondary flywheel 3, and the energy storing elements 20. Each of the energy storing elements 20 further extends into windows 21, 22 which are respectively provided in the discs 23 and 24. Deformation of energy storing elements 20 takes place in response to angular displacement of the flange 12 relative to the discs 23, 24 and/or vice versa.

The discs 23, 24 of the second damping unit flank the flange 12, and their radially inner portions are shaped (dished) to abut each other (see the upper portion of FIG. 1) and to be affixed to the secondary flywheel 3 by fasteners in the form of rivets 25. These rivets serve to transmit torque between the discs 23, 24 and the flywheel 3 as well as to maintain the radially innermost portions of the discs in predetermined axial positions relative to the secondary flywheel.

A sealing diaphragm 26 is clamped between the disc 24 and the secondary flywheel 3. In order to seal the radially inner portion of the chamber 8, the radially outermost portion of the diaphragm 26 bears against the internal surface of the radially innermost portion of the section 11 forming part of the housing of the primary flywheel 2. The diaphragm 26 is at least slightly resilient and yieldably bears against the section 11.

The damper 7 further comprises a friction generating device 27 which is installed radially inwardly of the rivets 25 and is or can be active whenever at least one of the flywheels 2, 3 turns relative to the other flywheel. The arrangement can be such that the fiction generating device 27 opposes any and all angular movements of the flywheels 2, 3 relative to each other or that it becomes effective after a certain amount of angular displacement of the flywheel 2 relative to the flywheel 3 and/or vice versa. This second mode of operation can be said to constitute a delayed frictional damping action.

The antifriction bearing 6 cooperates with sealing elements 28, 29 in the form of rings having a substantially L-shaped cross-sectional outline and serving to establish a thermal barrier between the flywheel 3 (which is heated in response to engagement or disengagement of the aforementioned friction clutch) and the races and rolling elements of the bearing 6. The inner race of the bearing 6 is fixed in the optimum axial position by a washer-like retainer 30 which is caused to bear against the adjacent end face of the carrier or hub 32 when the carrier is affixed to the output element OE of the combustion engine by the aforementioned fasteners extending through the bores or holes 4. At such time, the retainer 30 also serves as a stop for the heads of such fasteners.

The secondary flywheel 3 is further provided with suitable passages 31 for circulation of a coolant (normally atmospheric air) which flows through such passages when the output element OE of the engine drives the primary flywheel 2 and the latter drives the input element IE of the transmission by way of the secondary flywheel 3 and the friction clutch which is carried by the flywheel 3.

The carrier or hub 32 can be made of gray cast steel and is provided with an axial extension 33 in the form of a ring or sleeve extending toward the engine, i.e., away from the secondary flywheel 3. The external surface 37 of the extension 33 is a press fit in and carries the disc-shaped section or element 10 of the primary flywheel 2. A second surface 36 of the carrier 32 is located radially inwardly of the extension 33 and of its external surface 37 and forms part of a cylindrical seat 34 for a pilot bearing PB (FIG. 2). The bearing PB is a press fit in the seat 34 and its surface 36 and serves to receive and center the free end of the input element IE of the transmission which receives torque when the aforementioned friction clutch is engaged to transmit torque from the secondary flywheel 3 to the input element IE of the transmission through the customary clutch plate or clutch disc of the friction clutch. The pilot bearing PB is or can be mounted in such axial position within the seat 34 that it is surrounded by the sections or elements 10, 11 of the housing of the primary flywheel 2.

For the sake of convenient comparison, the lower portion of FIG. 1 illustrates a conventional carrier or hub, and the upper portion of FIG. 1 (as well as each of FIGS. 2 and 3) illustrates a carrier 32 which embodies one form of the present invention. The novelty resides particularly in the configuration, dimensioning and other features of a portion 35 which is disposed radially and axially between the external surface 37 of the extension 33 and the second surface 36 forming part of the cylindrical seat 34 for the pilot bearing PB. As already mentioned above, the element or disc 10 of the primary flywheel 2 is a press fit on the external surface 37 of the extension 33, and the pilot bearing PB is a press fit in the surface 36, i.e., in the seat 34 of the carrier 32.

Figure 3:
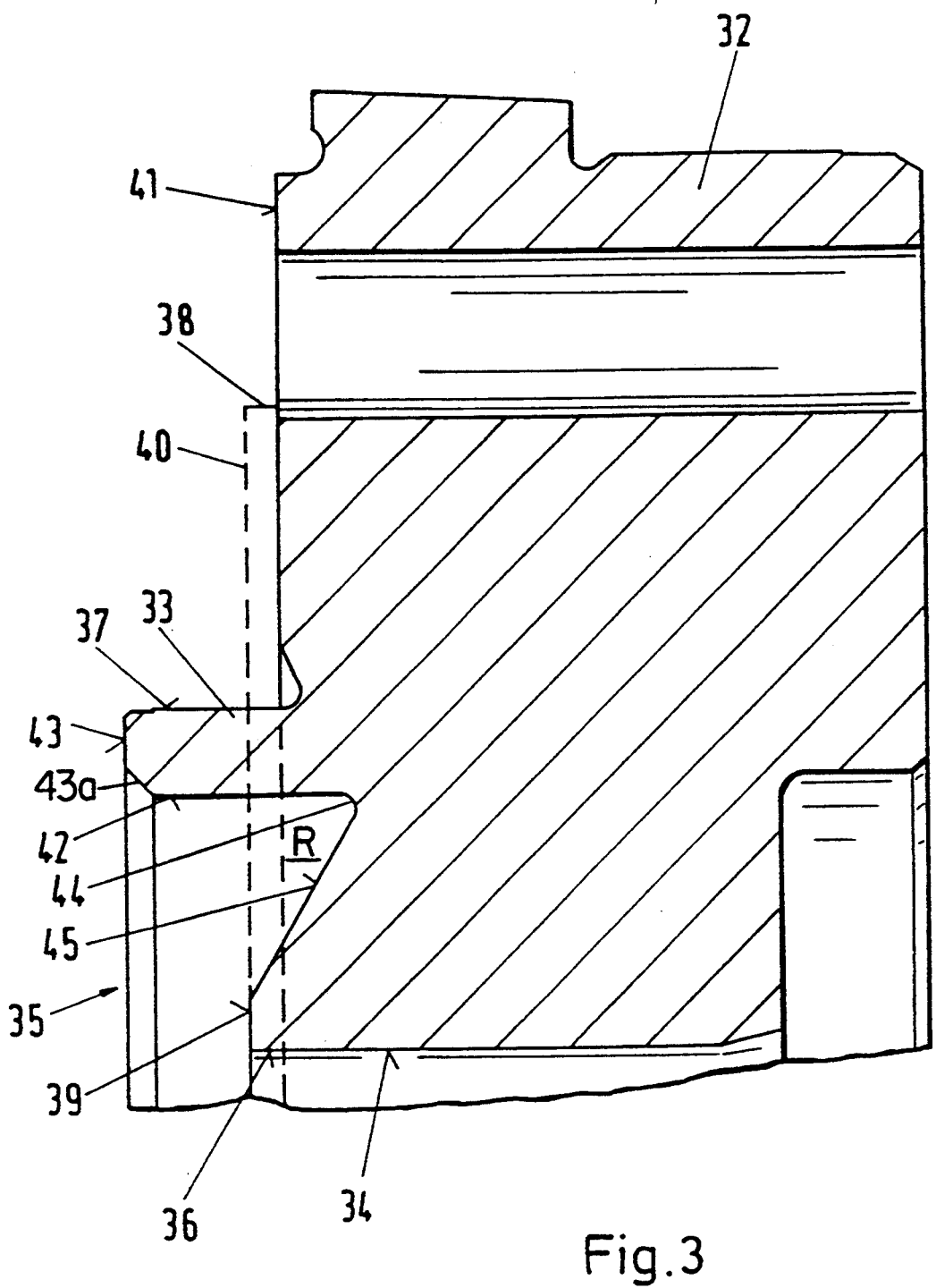
FIG. 3 is a greatly enlarged view of a portion of the carrier which is shown in FIG. 2.

As can be best seen in FIG. 3, at least a portion of the second surface 36 (actually the entire second surface 36) overlaps a portion of the external surface 37 (as seen in the direction of the axis X—X). The extent of overlap is shown at 38 and, in the illustrated embodiment, corresponds to the axial length of the second surface 36. The broken line 40 denotes in FIG. 3 the plane of that portion 39 of the left-hand end face of the carrier 32 which is adjacent the free end of the second surface 36. The character 41 denotes the other portion of the left-hand end face of the carrier 32, namely the portion which is located radially outwardly of the extension 33 and its external surface 37. The axial distance between the portions 39 and 41 of the left-hand end face of the carrier 32 matches the extent (38) to which the second surface 36 overlaps the external surface 37 (as seen in the direction of the axis X—X. The portion 39 is nearer to the combustion engine than the portion 41. The extent or distance 38 can equal or approximate 20 percent of the axial length of the external surface 37. The extent (38) of overlap can be increased or reduced within a rather wide range and can also be zero, i.e., the portions 39 and 41 of the left-hand end face of the carrier 32 (as seen in FIGS. 1, 2 and 3) can be located in or at least close to a common plane which is or can be normal to the axis X—X.

The extension 33 of the carrier 32 has an internal surface 42 which is or can be a cylindrical surface and surrounds an annular recess or groove R in the portion 35 between the surfaces 36 and 37. The internal surface 42 can serve to center the carrier 32 (and hence the composite flywheel 1) on a suitable collar CO of the output element OE of the combustion engine when the improved flywheel 1 and its carrier 32 are properly installed between the output element OE and the input element IE of the transmission. The internal surface 42 extends from a radially extending end face 43 of the extension 33 in a direction away from the engine, and the end face 43 can have a small bevelled conical portion 43a flaring radially outwardly to facilitate the introduction of the collar CO into the space which is surrounded by the internal surface 43. From the bevelled portion 43a, the internal surface 42 extends axially of the carrier 32 beyond the portions 39 and 41 at the left-hand end face of the carrier and all the way to the deepmost portion of the recess R.

The deepmost portion of the recess R is bounded by a concave surface 44 which merges into the internal surface 42 as well as into a frustoconical surface 45 extending toward the axis X—X in a direction away from the flywheel 3 and all the way to the portion 39 of the left-hand end face of the carrier 32. The imaginary apex of the cone including the frustoconical surface 45 is located to the left of the second surface 36 (as viewed in each of FIGS. 1, 2 and 3). The angle of inclination of the frustoconical surface 45 can be varied within a wide range; in fact, the illustrated frustoconical surface 45 can be replaced with a cylindrical surface which is parallel to and is radially inwardly spaced apart from the illustrated cylindrical internal surface 42. It is further possible to replace the illustrated cylindrical internal surface 42 with a frustoconical surface whose imaginary apex is located to the left or to the right of the recess R.

It will be readily appreciated that the resiliency of the extension 33 (i.e., of that portion of the carrier 32 which is disposed between the surfaces 37 and 42) can be varied by altering the angle between the surfaces 42 and 45 and/or by altering the axial distance of the bevelled surface 44 from the portions 39, 41 of the left-hand end face of the carrier 32. The reason is that the yieldability of such extension varies in dependency on the extent of reduction of the radial dimension of the extension. The recess R can be formed during making of the carrier 32, i.e., in a casting machine if the carrier is made of gray cast steel or in an extruder if the carrier is an extrusion. Alternatively, the carrier 32 can be made of a blank which must be treated in a material removing machine to form the recess R and to impart to the extension a requisite degree of resiliency.

The reduction of stiffness (i.e., of strength depending on shape or design) of the carrier 32 in the region of its portion 35 (between the surfaces 36 and 37) renders it possible to ensure that the forces which develop as a result of press fitting the extension 33 into the disc-shaped element 10 of the primary flywheel 2 cannot affect the second surface 36 to the same extent as when the carrier 32 is made in a conventional way. Thus, one can eliminate or at least greatly reduce the likelihood of such deformation of the second surface 36 which would render it likely to prevent or to render more difficult the mounting of the seat 34 and its surface 36 on the pilot bearing PB. Moreover, the aforedescribed reduction of stiffness of the carrier 32 at the extension 33 ensures that the width of the clearance for the pilot bearing PB cannot be reduced below a predetermined minimum acceptable value. Excessive reduction of such clearance could result in a pronounced shortening of useful life of the bearing PB and of the entire composite flywheel 1, primarily due to excessive wear upon the pilot bearing. Thus, due to the ability of the extension 33 to yield, the likelihood of deformation of the second surface 36 in the radial direction of the carrier 32 is greatly reduced so that one can eliminate one or more presently required (or at least desirable) final treatments of the carrier 32 and/or pilot bearing PB such as rubbing, reaming or the like. This, in turn, renders it possible to reduce the cost of assembly of the composite flywheel 1 by reducing the number of treatments and/or by reducing the interval of time which is required to assemble the carrier 32 with the input element IE and the output element OE as well as to assemble the carrier with the disc-shaped element 10 and the pilot bearing PB.

The configuration of the portion 35 of the carrier 32 is selected in such a way that at least a part of transition from the locus of a press fit with the less sensitive element (disc 10) to the locus of a press fit with the more sensitive element (pilot bearing PB) is designed to ensure that the paths for lines of force which develop due to fitting of the extension 33 into the element 10 are interrupted by the recess R so that such lines of force cannot unduly affect the diameter, the configuration and/or other parameters of the surface 36 (and hence of the press fit between the carrier 32 and the pilot bearing PB). The recess R may but need not be an uninterrupted circumferentially complete groove in the left-hand end face of the carrier 32, and the cross-sectional area of the portion 35 of the carrier 32 is preferably but need not always be constant all the way around the axis X—X.

The illustrated surfaces 36 and 37 are coaxial cylindrical surfaces. The common axis of such cylindrical surfaces is also the common axis (X—X) of the carrier 32, flywheels 2, 3 and antifriction bearing 6. However, it is equally within the purview of the invention to replace the surface 36 and/or 37 with a frustoconical surface.

It is presently preferred to select the axial positions of the surfaces 36 and 37 in such a way that only a portion of one of these surfaces axially overlapped by the other surface. In the illustrated embodiment, a portion of the external surface 37 overlaps the entire second surface 36.

The pilot bearing PB can serve to directly or indirectly center the input element IE of the variable-speed transmission in a motor vehicle. For example, the input element IE can constitute the part which actually transmits torque to other parts of a transmission. Alternatively, the input element IE can constitute an intermediate shaft which, in turn, transmits torque to the input element of a variable-speed transmission in a manner as known, for example, from so-called transaxle type motor vehicles.

The internal surface 42 of the extension 33 can be finished to center the carrier 32 (and the entire composite flywheel 1) on the collar CO of the output element OE subsequent to fitting of the disc-shaped element 10 on the external surface 37. Alternatively, the internal surface 42 can be treated and finished prior to press fitting of the extension 33 in the disc-shaped element 10. A finished centering seat for the carrier 32 on the collar CO of the output element OE can be achieved by proper consideration of the eventually developing radial deformation, for example, by so-called leading in the course of the milling operation. This is due to the fact that the provision of specially configured portion 35 with its recess R renders it possible to ensure that deformation which develops or is apt to develop in the radial direction does not involve any crowning or the like but is constant or varies linearly in the axial direction. Such design is particularly advantageous in many instances because it is no longer necessary to set up a material removing treating machine for the purpose of carrying out a final treatment in an erection or assembly line. The advantages are even more pronounced if the further manipulation of the improved carrier (e.g., the assembling of a composite flywheel or another apparatus which employs the carrier) involves the installation of parts which are sensitive to contamination, e.g., friction generating devices (27), bearings (6, PB) and the like. Furthermore, it is possible to dispense with a cleaning step following a material removing operation (no such operation is necessary) which also contributes to shorter assembly times and hence to lower cost of the carrier 32 and/or of the apparatus embodying the carrier.

The composite flywheel 1 which embodies the improved carrier 32 exhibits the advantage that at least the surfaces 36, 37 and the portion 35 are configurated, constructed and assembled to prevent a reduction of the clearance between the pilot bearing PB and/or the antifriction bearing 6 on the one hand, and the carrier on the other hand, below a predetermined value which would shorten the useful life of the composite flywheel as a result of deformation of the carrier 32 at the external surface 37 due to the establishment of a press fit between the extension 33 and the disc-shaped element 10 of the primary flywheel 2. The just outlined feature of the composite flywheel 1 renders it possible to ensure that the radial movability of the inner and/or outer race of the bearing 6 and/or PB relative to the other race remains intact to the required extent. Such radial movability is provided, for example, due to selection of the fit between the element 10 and the extension 33.

One of the presently preferred materials for the carrier 32 is cast steel. However, it is also possible to extrude the carrier 32 in such a way that the portion 35 and its recess R are formed in the course of the extruding operation. Thus, one can dispense with at least one step by the simple expedient of extruding the carrier 32 from a suitable material.

It is further preferred and advantageous to ensure that the fitting of the disc-shaped element 10 onto the external surface 37 of the extension 33 take place subsequent to a high-precision treatment of the surface 37 and/or the internal surface of the element 10, e.g., with a stamping tool. Such treatment renders it possible to achieve more accurate fits between the adjacent surfaces of the carrier 32 and element 10 which, in turn, ensures more uniform distribution of stresses which are applied to the external surface 37 (as seen in the axial direction of the carrier) by the relatively unsensitive or less sensitive element 10. Furthermore, it is often advisable and advantageous if the recess R extends beyond the region (38) of axial overlap of the surfaces 36 and 37. In the illustrated embodiment, the recess R extends axially inwardly of the carrier 32 beyond the second surface 36.

The improved carrier (and the composite flywheel which embodies such carrier) can be modified in a number of additional ways without departing from the spirit of the present invention. For example, certain features of the heretofore described embodiments can be used in any suitable combination with each other. Furthermore, the improved carrier 32 can be used in other types of torque-transmitting apparatus wherein the extension 33 is a press fit in a part other than a disc-shaped element and/or wherein the surface 36 is a press fit on a component other than a bearing or pilot bearing. Still further, at least some of the individual features of the improved carrier and/or of the improved composite flywheel are believed to be novel per se. The same holds true for the method or methods of making the carrier, of conforming the carrier to the intended use, and of combining the carrier with other parts to form therewith a composite flywheel or another torque-transmitting apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A dynamically balanced rotary carrier comprising a metallic material and having an axis of rotation and a ring-shaped axial extension, said extension having an external surface which is a press fit in a substantially radially outwardly extending first element and said carrier further having a second surface disposed radially inwardly of said external surface and being a press fit on a further element, one of said elements being more sensitive to deformation than the other of said elements and said carrier further having a recess in a portion at least of a region of propagation of lines of force, developing as a result of the establishment of press fit between said other element and the respective surface, toward the one element, one of said surfaces at least partially overlaps the other of said surfaces in the direction of said axis.

2. The carrier of claim 1, wherein the first element includes a substantially disc-shaped component.

3. The carrier of claim 1, wherein the first element includes a flywheel.

4. The carrier of claim 1, wherein the first element forms part of a primary flywheel of a divided flywheel.

5. The carrier of claim 1, wherein the first element forms part of an input element of a twin-mass flywheel.

6. The carrier of claim 1, wherein the second element is a pilot bearing for an input element of a transmission in a motor vehicle.

7. The carrier of claim 1, wherein said extension has an internal surface disposed radially inwardly of said external surface and constituting a centering seat for a centering collar on a crankshaft of an internal combustion engine.

8. The carrier of claim 7, wherein said internal surface has a finish which is applied thereto subsequent to press fitting of the first element onto said external surface.

9. The carrier of claim 7, wherein said internal surface has a finish which is applied thereto prior to press fitting of the first element onto said external surface.

10. The carrier of claim 1, wherein said metallic material is cast steel.

11. The carrier of claim 1, wherein said press fit between the first element and said external surface is established subsequent to a precision treatment of said external surface and an internal surface of said first element.

12. The carrier of claim 1, wherein at least a portion of one of said surfaces overlaps at least a portion of the other of said surfaces in the direction of said axis and said recess extends in the direction of said axis beyond said overlapping portions of said surfaces.

13. A composite flywheel comprising a primary flywheel including a disc; a carrier having a ring-shaped axial extension including an external surface which is a second surface disposed radially inwardly of said external surface and being fit on a pilot bearing for a rotary transmission shaft, said carrier also having a portion extending radially and axially between said surfaces, an antifriction bearing installed surrounding said carrier and said portion of said carrier being configurated, constructed and assembled to prevent a deformation of said second surface when said external surface is press fit in said disc, which would shorten the useful life of the pilot bearing, as a result of deformation of said carrier at said external surface due to the establishment of the press fit between said external surface and said disc, said portion of said carrier includes a recess and at least a portion of one of said surfaces overlaps at least a portion of the other of said surfaces in the axial direction of said flywheels, said recess extending axially of said flywheels beyond said overlapping portions of said surfaces.

14. The composite flywheel of claim 13, wherein said carrier contains cast steel.

15. The composite flywheel of claim 13, wherein the press fit between said disc and said external surface is established subsequent to a precision treatment of said external surface and a surface of said disc.

* * * * *